United States Patent [19]

Hasegawa et al.

[11] Patent Number: 5,026,515
[45] Date of Patent: Jun. 25, 1991

[54] CRUDE TIRE SETTING METHOD IN TIRE VULCANIZING PRESS

[75] Inventors: Akira Hasegawa; Yoshinobu Kato; Toshifumi Murakami, all of Nagasaki, Japan

[73] Assignee: Mitsubishi Jukogyo Kabushiki Kaisha, Tokyo, Japan

[21] Appl. No.: 334,884

[22] Filed: Mar. 30, 1989

[30] Foreign Application Priority Data

Apr. 1, 1988 [JP] Japan ............... 63-78255

[51] Int. Cl.$^5$ .................................. B29C 35/00
[52] U.S. Cl. .................... 264/315; 264/326; 425/36; 425/48; 425/52; 425/58; 425/38; 425/43
[58] Field of Search ............. 264/315, 326; 425/29, 425/36, 48, 33, 38, 58, 52, 43

[56] References Cited

U.S. PATENT DOCUMENTS

| | | | |
|---|---|---|---|
| 3,794,457 | 2/1974 | Gazuit | 425/36 |
| 3,837,770 | 9/1974 | Gazuit | 425/33 |
| 4,444,715 | 4/1984 | Nixon et al. | 264/315 |
| 4,447,385 | 5/1984 | Blosser et al. | 264/315 |
| 4,800,059 | 1/1989 | Drewel et al. | 425/58 |
| 4,846,649 | 7/1989 | Hasegawa et al. | 425/58 |

Primary Examiner—Jan H. Silbaugh
Assistant Examiner—Mathieu Vargot
Attorney, Agent, or Firm—Wenderoth, Lind & Ponack

[57] ABSTRACT

A method of setting a crude tire into a space between upper and lower molds in a tire vulcanizing press having upper and lower mold units movable relative to each other includes the steps of pushing an upper bead of the crude tire into a bead of the upper mold by a vertically movable device which supports the upper bead of the crude tire, introducing gas into a bladder to expand the bladder while restricting the elevation of an upper portion fixing ring of a bladder holder mechanism attached to the lower mold unit, and pushing a lower bead of the crude tire into a bead of the lower mold by utilizing the expansion forces of the bladder. With the bladder enclosed air-tightly, the tire lower bead can efficiently be pushed into the lower mold bead.

1 Claim, 3 Drawing Sheets ation of the cylinder or expanding forces of the gas, until the ring 6a comes into contact with the upper bead holder 5.

FIG. 3E.

The upper and lower mold units are moved to define a completely closed molding cavity. A vulcanizing medium is introduced into the bladder 10 to press the crude tire 9 against the molds 1, 2 from the interior under strong pressure.

FIG. 3F.

After the tire is vulcanized, the upper and lower molds units are moved away and the vulcanized tire is peeled off from the upper and lower molds.

The above-mentioned prior art presents several problems because a large amount of gas is introduced to the interior of the crude tire for pushing and fitting the beads into the bead rings under the gas (air) pressure within the crude tire.

For example, in the case of crude tires having their beads deformed into an elliptical shape, or tires having bead surfaces which are not even but ragged due to the presence of joints or the like of members making up the beads, a complete sealing cannot be established between the beads of a crude tire and the bead rings of molds. Therefore, sometimes the gas introduced to the interior of the crude tire cannot satisfactorily achieve the intended pressure effect.

Deformation of the beads of crude tires into an elliptical shape, for example, inevitably occurs very often during the production, storage and transportation of crude tires.

With the current state of production technology in the art, such joints or the like are indispensable to the bead members.

Further, the incorporation of an apparatus, piping and control unit necessary to introduce gas raises the production cost of the produced tires.

In addition, since it takes a significant amount of time to introduce gas into the crude tires, the tire vulcanizing press requires a correspondingly longer production time per crude tire.

SUMMARY OF THE INVENTION

It is, therefore, an object of the present invention to eliminate the need of introducing gas to the interior of the crude tire in the above-mentioned operating step illustrated in FIG. 3C, to improve the efficiency of pushing the crude tire bead into the mold bead ring, and to simplify the structure of a tire vulcanizing machine or press.

According to the present invention, at the time that a lower bead of a crude tire is pushed into a lower mold unit, gas is introduced into a bladder to expand the bladder, while restricting the elevation of an upper portion fixing ring of a bladder holder mechanism, and the lower bead of the crude tire is pushed into a bead ring of a lower mold.

Since the bladder is enclosed air-tightly, the gas introduced into the bladder will not leak through the gap between the crude tire bead and the mold bead ring, so that the lower bead of the crude tire can efficiently be pushed into the bead ring of the lower mold.

CRUDE TIRE SETTING METHOD IN TIRE VULCANIZING PRESS

FIELD OF THE INVENTION

The present invention relates to a method of positively fitting upper and lower beads of a crude tire into upper and lower bead rings of tire molds in a tire vulcanizing press.

DESCRIPTION OF THE PRIOR ART

Figure 2:
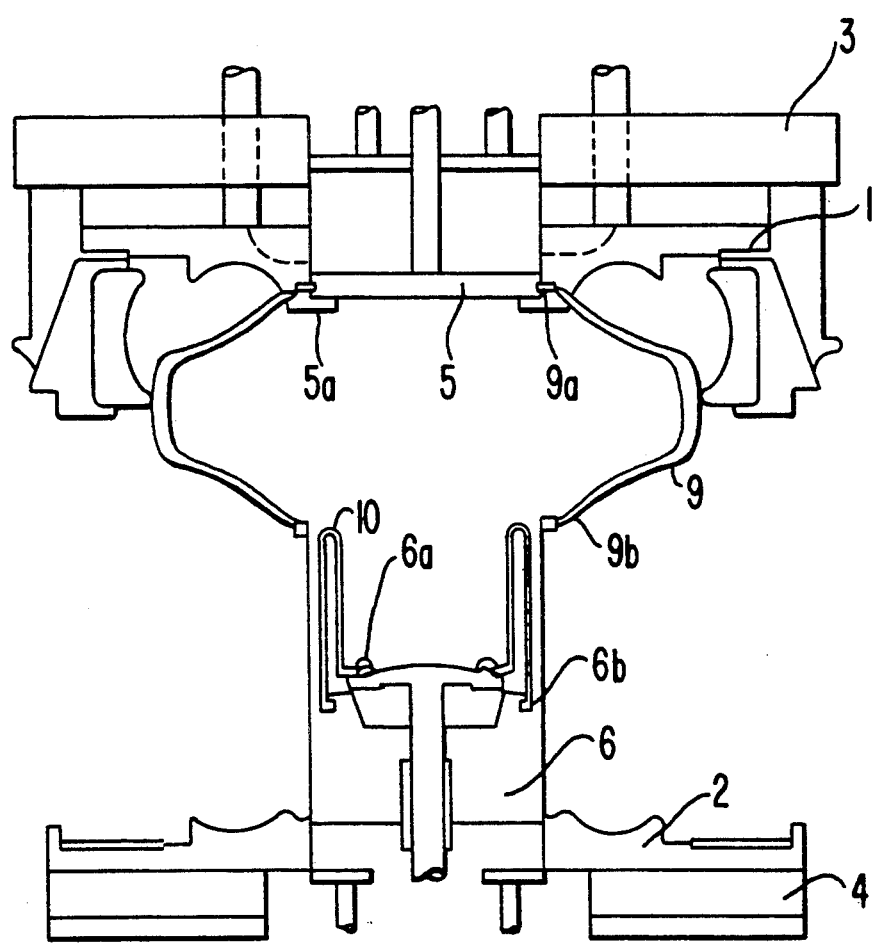

Referring to FIG. 2, an upper mold 1 is attached to an upper mold attachment member 3, and an upper bead holder 5 for supporting an upper bead of a crude tire is vertically movably attached to the center of the upper mold 1.

The upper bead holder 5 has a plurality of pawls 5a attached thereto and capable of expanding radially.

There are provided a cylinder for moving the upper bead holder 5 in the vertical direction, and another cylinder for expanding and contracting the pawls 5a.

A lower mold 2 is fixed to a lower mold attachment member 4, and a bladder holder 6 is vertically movably attached to the center of the lower mold 2.

In an upper region of the bladder holder 6, an upper portion fixing ring 6a for fixing an upper portion of a bladder 10 is fastened to a cylinder provided for raising and lowering the upper fixing ring 6a. A lower portion fixing ring 6b is attached to a lower portion of the bladder 10. The lower portion fixing ring 6b is movable by another cylinder in the vertical direction.

The operating steps will be described below with reference to FIGS. 3A–3F.

FIG. 3A.

A crude tire 9 is transported by a loading device 11 into the center of a space defined between the upper mold 1 and the lower mold 2.

FIG. 3B.

The upper bead holder 5 is lowered by operating the cylinder. As soon as the upper bead holder 5 enters the interior of the tire 9, the plurality of pawls 5a are expanded to support the upper bead 9a of the crude tire from below.

Though not shown, a centering device may be provided on the upper bead holder for aligning the center of the upper mold 1 and the center of the crude tire 9.

While the upper bead 9a of the crude tire 9 is held by the upper bead holder 5, the latter is raised by operating the cylinder, whereupon the upper bead 9a of the crude tire 9 is pushed into the bead ring of the upper mold 1.

FIG. 3C.

The entirety of upper mold unit constituted by elements 1, 3, 5 is lowered by operating a cylinder, a ball and screw mechanism or the like, until the crude tire 9 comes into contact with a lower bead ring 2a.

In a state in which the upper and lower beads 9a, 9b of the crude tire are held against the bead ring of the upper and lower molds, respectively, a large amount of gas is introduced to the interior of the crude tire for pushing the lower bead 9b of the crude tire into the bead ring of the lower mold 2. The upper bead holder 5 and the bladder holder 6 have the capability of sealing gas.

FIG. 3D.

The plurality of pawls 5a holding the upper bead of the crude tire 9 from below are contracted, and the upper bead holder 5 is raised while introducing gas into the bladder 10. This causes the upper portion fixing ring 6a of the bladder 10 to be moved upwardly under oper- FIG. 2 is a vertical sectional view of a conventional portion of a tire vulcanizing press which is adopted for use under the method according to the present invention; and FIGS. 3A-3F illustrate successive operating steps of the tire vulcanizing press in accordance with a conventional method.

DETAILED DESCRIPTION OF THE PREFERRED EMBODIMENTS

Referring to FIG. 1, reference numeral 1 designates an upper mold, 2 a lower mold, 2a a lower bead ring, 3 an upper mold attachment member, 4 a lower mold attachment member, 5 an upper bead holder, 5a a plurality of pawls capable of radially expanding and contracting, 6 a bladder holder, 6a an upper portion fixing ring, 6b a lower portion fixing ring, 9 a crude tire, 9a an upper bead of the crude tire, 9b a lower bead of the crude tire, 10 a bladder, and 11 a loading device, respectively.

Figure 1A:
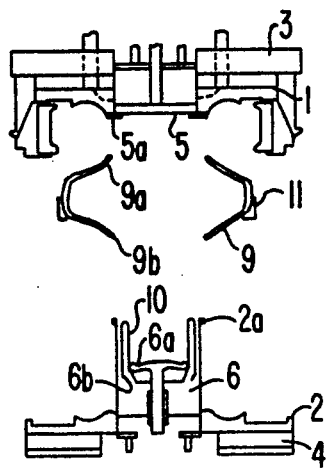
FIGS. 1A–1G illustrate successive operating steps of a tire vulcanizing press in accordance with an embodiment of the present invention.
Figure 1B:
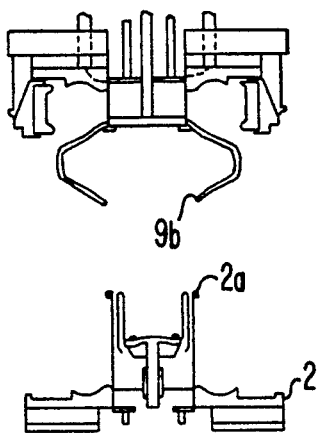
Figure 3A:
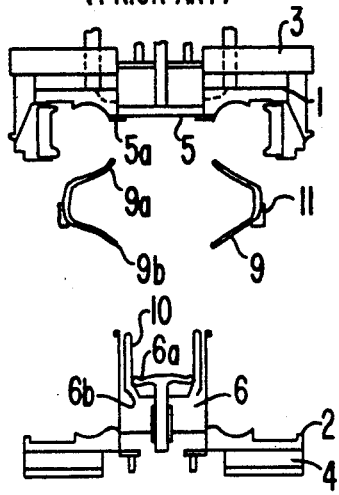
Figure 3B:
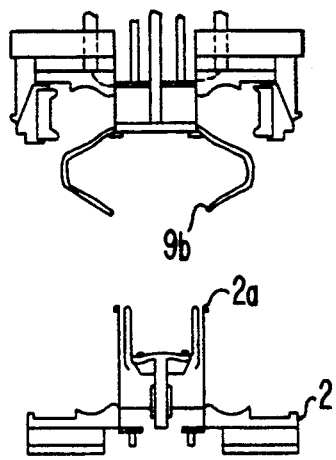

The operating steps illustrated in FIGS. 1A, 1B are the same as the aforementioned operating steps illustrated in FIGS. 3A, 3B and, therefore, the description thereof is omitted here.

Figure 1C:
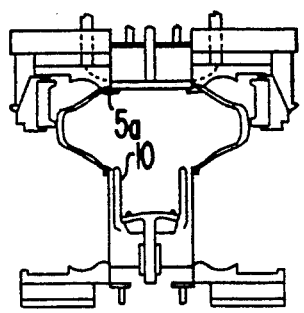

In FIG. 1C, the entirety of the upper mold unit constituted by elements 1, 3, 5 is lowered by operating a cylinder, a ball and screw mechanism or the like, until the crude tire 9 comes into contact with the lower bead ring 2a.

Figure 3C:
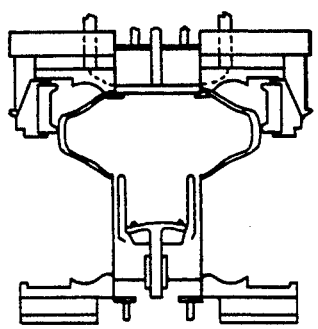

It is to be noted that the step of introducing gas to the interior of the crude tire as set forth in connection with the operating step illustrated in FIG. 3C is omitted.

Figure 1D:
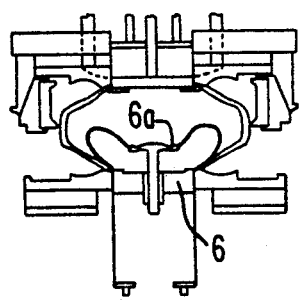

In FIG. 1D, in a state in which the lower bead 9b of the crude tire is held against the lower bead ring 2a of the lower mold, gas is introduced into the bladder 10 to expand the same, while restricting the elevation of the upper portion fixing ring 6a of the bladder holder 6. Under expansion forces of the bladder 10, the lower bead 9b of the crude tire is pushed into the lower bead ring 2a of the lower mold 2. (Note that although the upper portion fixing ring 6a is shown as being raised halfway in FIG. 1D, the ring 6a may be maintained at the position shown in FIG. 1C.)

Figure 1E:
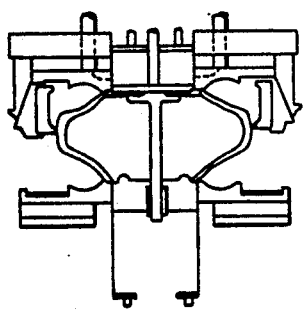
Figure 1F:
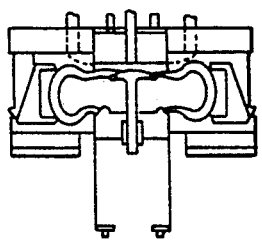
Figure 1G:
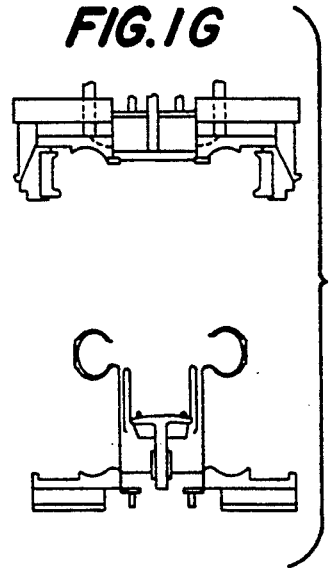
Figure 3D:
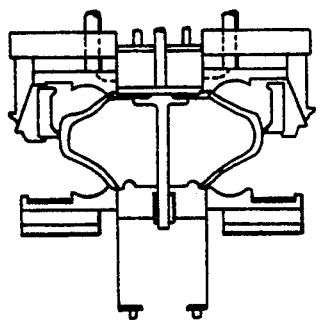
Figure 3E:
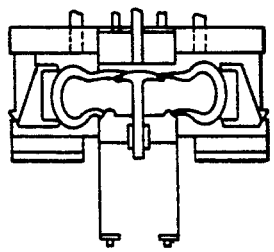
Figure 3F:
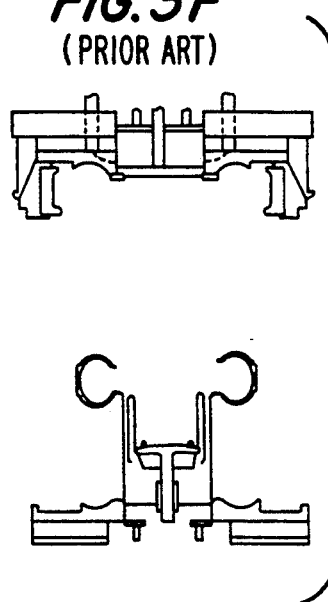

The illustrated steps in FIGS. 1E-1G are the same as the aforementioned steps illustrated in FIGS. 3D-3F and, therefore, the description thereof is omitted here. It is to be noted that, in the step illustrated in FIG. 1E, the upper portion fixing ring 6a of the bladder holder 6 is released from the restriction of its elevation, so that the upper portion fixing ring 6a is allowed to rise until it comes into contact with the upper bead holder 5.

As mentioned above, because the bladder is expanded while restricting the elevation of the upper portion fixing ring of the bladder holder attached to the lower mold unit, to thereby push the lower bead of the crude tire into the lower bead ring of the lower mold, without introducing gas into the crude tire, the present invention can provide the following advantageous effects.

a. The crude tire can be set into the molds with a high degree of accuracy and without being adversely affected by poor sealability due to possible deformation of the beads of the crude tire.

b. The apparatus necessary for introducing gas into the crude tire can be dispensed with.

c. The upper bead holder and the bladder holder require no capability of sealing gas.

What is claimed is:

1. A method of setting a crude tire in a tire vulcanizing press having upper and lower mold units movable relative to each other, the upper mold unit including an upper mold having an upper bead ring, and a bead holder device movable vertically relative to the upper mold and having supporting means for supporting an upper bead of a crude tire to be vulcanized in the press, and the lower mold unit including a lower mold having a lower bead ring, a bladder having upper and lower portions, and a bladder holder mechanism having means holding the lower portion of the bladder and an elevatable upper portion fixing ring disposed within the lower bead ring and to which the upper portion of the bladder is fixed, said method comprising:

pushing an upper bead of a crude tire into the upper bead ring of the upper mold by moving the bead holder device vertically towards the upper mold with the upper bead of the crude tire supported by the supporting means;

positioning a lower bead of the crude tire against the lower bead ring of the lower mold;

subsequent to said step of positioning, inflating the bladder, while maintaining the upper portion fixing ring at a fixed elevation in the vulcanizing press, to generate expansion forces exerted by the inflating bladder which push the lower bead of the crude tire into the lower bead ring of the lower mold; and ceasing to maintain the upper portion fixing ring at a fixed elevation in the vulcanizing press, after the lower bead of the crude tire had been pushed into the lower bead ring of the lower mold under the expansion forces exerted by the inflating bladder, so as to cause the upper portion fixing ring to elevate owing to the inflated state of the bladder.

* * * * *